United States Patent

Sakata

[11] Patent Number: 5,781,354
[45] Date of Patent: Jul. 14, 1998

[54] POSITIONING DEVICE FOR CAR SIDEVIEW MIRROR

[75] Inventor: Ikuo Sakata, Yamato, Japan

[73] Assignee: Ichikoh Industries, Ltd., Tokyo, Japan

[21] Appl. No.: 710,768

[22] Filed: Sep. 20, 1996

[30] Foreign Application Priority Data

Sep. 22, 1995 [JP] Japan ................... 7-244401

[51] Int. Cl.⁶ ............................................ B60R 1/08
[52] U.S. Cl. .................. 359/841; 359/872; 359/877; 248/549
[58] Field of Search ...................... 359/841, 877, 359/872; 248/549

[56] References Cited

U.S. PATENT DOCUMENTS

| 4,981,349 | 1/1991 | Tamiya et al. | 359/877 |
| 5,594,590 | 1/1997 | Ishiyama | 359/841 |

FOREIGN PATENT DOCUMENTS

| 61-94845 | 5/1986 | Japan | B60R 1/06 |
| A 01-289730 | 11/1989 | Japan | 359/877 |
| 04-76196 | 7/1992 | Japan | H02P 3/08 |
| 04-114839 | 10/1992 | Japan | B60R 1/06 |

Primary Examiner—Paul M. Dzierzynski
Assistant Examiner—John Juba, Jr.
Attorney, Agent, or Firm—Foley & Lardner

[57] ABSTRACT

A positioning device intended for use in a housing of a car sideview mirror to turn the housing to a viewing position where the driver is allowed to have a rear view, a front parking position where the rear side of the housing is generally parallel with the car body and to a rear parking position where the mirror side of the housing is generally parallel with the car body, has a stationary member to be coupled to a base of the sideview mirror and a rotary member to be coupled to the housing. The stationary member has a pair of arcuate grooves formed therein and the rotary member has also a pair of arcuate grooves therein correspondingly to those in the stationary member. The corresponding arcuate grooves in the stationary and rotary members define together regions, respectively, in each of which a ball is retained so as to roll. Also a stopping mechanism is provided between the rotary and stationary members to limit the turning of the housing to a predetermined range. The rotary member is rotatable through an angle corresponding to the arcuate groove in the stationary member as well as an angle corresponding to the arcuate groove in the rotary member, so the positioning device can be commonly used in sideview mirrors different from each other in the angle from the viewing position to the rear parking position as well as in the angle from the viewing position to the front parking position. Furthermore, a same positioning device can be used commonly in a driver sideview mirror for a right-steered car and a passenger sideview mirror for left-steered car. Therefore, it is not necessary to provide many different types of the positioning devices for use in car sideview mirrors.

6 Claims, 13 Drawing Sheets

5,781,354

POSITIONING DEVICE FOR CAR SIDEVIEW MIRROR

BACKGROUND OF THE INVENTION a) Field of the Invention

The present invention relates to a positioning device for a sideview mirror provided on either side of a car body, and more particularly, to a positioning device designed for use in a sideview mirror housing to turn, manually or by a motor, the housing having a mirror unit assembled therein to a viewing position where the housing protrudes laterally from the car body for the driver to have an appropriate a rear view, a front parking position where the rear side of the housing is generally parallel with the car body and to a rear parking position where the mirror side of the housing is generally parallel with the car body and also to a car sideview mirror equipped with such a positioning device.

b) Prior-art Statement

The conventional sideview mirrors of this type are composed each of a base to be fixed to a car body, a housing having a mirror unit assembled therein, and a positioning device which turns the housing through a predetermined range of angle with respect to the base.

For example, JP-A-61-94845 discloses a sideview mirror with a housing having a mirror unit assembled therein and which can be manually turned. A positioning device used in the sideview mirror is composed of a stationary member to be coupled to a base which is to be fixed to a car body, a rotary member to be coupled to the housing, and a mechanism disposed between the rotary and stationary members to support the rotary member rotatably in relation to the stationary member. The rotary member is coupled to the stationary member by means of a clutch. When the housing is pushed by hand or when a person or thing touches the housing which will thus be applied with an external force larger than predetermined, the clutch is released and the rotary member rotates together with the housing in a direction in which the housing has been pushed.

Also, a sideview mirror of which the housing is turned by a motor is disclosed in JP-U-4-114839. A positioning device provided in the sideview mirror comprises a stationary member fixed to a base which is to be fixed to a car body, a rotary member to be coupled to the housing having a mirror unit assembled therein, and a driving mechanism disposed between the stationary and rotary members and which turns the rotary member including the motor. The motor is assembled along with a reduction gear unit and clutch in the rotary member. Of the gears included in the reduction gear unit, one works as a sun gear and another gear in mesh with the sun gear works as a planet gear. When the motor is put into run, the planet gear rotates while revolving about the sun gear, the rotary member rotates along with the motor, planet gear and other gears between the sun and planet gears, and thus the housing is turned from the viewing position to a rear parking position or vice versa. When a larger external force than predetermined is applied to the housing, for instance, when the housing is pushed by hand or when a person or thing touches the housing, the clutch is released, the rotary member rotates along with the motor and the reduction gear including the sun gear, and thus the mirror is turned from the viewing position to the rear parking position or vice versa.

The positioning device has a ball provided and retained in a concavity formed in the rotary member. When the housing is turned to the viewing or rear parking position, the ball abuts one end of a circular groove formed in the stationary member to block the rotary member further rotation. The maximum turn angle of the housing is determined by a projection extending from the stationary member toward the rotary member and which abuts a projection or one of the ends of a concavity formed on the rotary member.

As mentioned above, the positioning devices used in the conventional sideview mirrors include two basic types: One is designed for manually turning the housing and the other is for turning the housing by a motor. Cars of a same model include two types: One has a driver's seat at the right (will be referred to as "right-steered car" hereinafter) and the other has a driver's seat at the left (will be referred to as "left-steered car" hereinafter). On a same car, the geometric relation of the driver sideview mirror with the driver is different from that of the passenger sideview mirror with the driver. The geometric relation on a right-steered car is different from that on a left-steered car. Further, the turn angle of the housing from the viewing position to the rear parking position is different from that of the housing from the viewing position to the front parking position. Hence, considerably many different types of positioning devices are required to accommodate these many differences. In manufacturing such positioning devices, many kinds of molds and jigs must prepared, checked and correctly selected for production of parts of the positioning devices; many kinds of parts produced using the correctly selected molds and jigs must be correctly selected for assembling into positioning devices; and many finished positioning devices must be correctly selected for installation into sideview mirrors. These requirements currently cause the high costs for manufacturing the positioning devices.

SUMMARY OF THE PRESENT INVENTION

It is an object of the present invention to provide a car sideview mirror positioning device which permits to minimize the number of their types, and a sideview mirror provided with the positioning device.

The car sideview mirror positioning device according to the present invention comprises a stationary member to be coupled to a base of the car sideview mirror and which has a shaft, a rotary member to be coupled to a housing of the sideview mirror having a mirror unit assembled therein, a mechanism disposed between the stationary and rotary members to rotate the rotary member about the shaft of the stationary member, and a stopping mechanism consisting of a projection formed on the stationary member and a one on the rotary member, the projections being engageable with each other to limit the turn angle of the housing to a predetermined range.

The above rotary member turning mechanism comprises a pair of circular grooves formed in the stationary member in symmetric positions with reference to the shaft and each having a central angle a corresponding to the predetermined angle of the rearward turn of the housing from the viewing position, a pair of circular grooves formed in the rotary member oppositely to, and on a substantially same circumference as that of, the pair of circular grooves in the stationary member and each having a central angle β corresponding to a predetermined angle of turn extending from the predetermined angle of rearward turn of the housing, and a pair of balls disposed between the stationary and rotary members and which can be rolled along a same circumference as that of the circular grooves in the members.

As the housing is turned through the predetermined angle from the viewing position or through the predetermined angle extending from there, each ball rolls within a region defined by the circular groove formed in the stationary member and that in the rotary members in a direction from one end to the other of the circular groove in the stationary member, while the rotary member rotates through a the central angle α of the circular groove in the stationary member as well as through a central angle β of the circular groove in the rotary member. That is, each ball is allowed to roll through the central angle α from one end to the other of the circular groove in the stationary member, while the rotary member is allowed to rotate through an angle (α+β) from the viewing position. When having arrived at the rear parking position, namely, at the end of the range of turn angle (α+β) from the viewing position, the rotary member is stopped by the stopping mechanism from rotating further rearward.

As the housing is turned forward from the viewing position, each ball overrides one end of the circular groove in the stationary member and further rolls only inside the circular groove in the rotary member, moving on the stationary member, while the rotary member is allowed to rotate through a maximum angle γ=(180°−α) forward from the viewing position. When having arrived at the front parking position, namely, at the end of the range of turn angle γ from the viewing position, the rotary member is stopped by the stopping mechanism from rotating further forward.

At each of the viewing, rear parking and front parking positions, the housing of a driver sideview mirror on a right-steered car, for example, forms a different angle with respect to the center line of the car from that of the housing of a driver sideview mirror on a left-steered car.

However, the range of housing turn angle can be set larger in the positioning device according to the present invention than that in the conventional positioning devices. More specifically, the angle of rearward turn from the viewing position and the angle of forward turn from the viewing position can be increased by an angle corresponding to the central angle β of the circular groove in the rotary member. Therefore, using a stationary member having the projection as the stopping mechanism changed in position but the circular-groove central angle and position of the circular groove not changed, it is possible to use a positioning device for use in a driver sideview mirror destined for use on a right-steered car, for example, commonly in a passenger sideview mirror on a left-steered car. In other words, the rotary member and other mechanisms incorporated therein can be used commonly in all the positioning devices. Especially, a positioning device of a type in which the rotary member rotation and housing turn are motor-driven, respectively, uses expensive motors and many reduction. Since these parts can be used commonly used in all the positioning devices, the costs for the parts can be considerably reduced.

The car sideview mirror according to the present invention comprises a base to be fixed to a car body; a housing having a mirror unit assembled therein; and a positioning device to turn the housing with respect to the base, the positioning devices comprising a stationary member to be coupled to a base of the car sideview mirror and which has a shaft; a rotary member to be coupled to a housing of the sideview mirror having a mirror unit assembled therein; a mechanism disposed between the rotary and stationary members to turn the rotary member about the shaft of the stationary member, the rotary member turning mechanism comprising a pair of circular grooves formed in the stationary member in symmetric positions with reference to the shaft and each having a central angle α corresponding to the predetermined angle of rearward turn of the housing from the viewing position, a pair of circular grooves formed in the rotary member oppositely to, and on a substantially same circumference as that of, the pair of circular grooves in the stationary member, each having a central angle β corresponding to a predetermined angle of turn extending from the predetermined angle of rearward turn of the housing, and a pair of balls disposed between the stationary and rotary members so as to roll circumferentially of the circular grooves in the members; and a stopping mechanism consisting of a projection formed on the stationary member and a one on the rotary member, the projections being engageable with each other to limit the turn angle of the housing to a predetermined range.

According to the present invention, the elements of the stopping mechanism, namely, the projections engageable on each other are provided on the base and rotary member, respectively. Therefore, a same positioning device can be used commonly in a driver sideview mirror on a right-steered car and a passenger sideview mirror on a left-steered car with the stationary member left unchanged. A same positioning device can be used commonly in sideview mirrors for different car models. Also, the base forming a part of a sideview mirror is formed for each of different car models, but since the projection on the base, included in the stopping mechanism which blocks the rotary member from rotating can be formed by molding in a different position for each car model, a same positioning device can be used in a sideview mirror for each of the different car models. Thus, the positioning device according to the present invention can be further commonly used in different types of sideview mirrors.

According to the present invention, a means of blocking the ball from rolling may be provided near each of the ends located diagonally of the circular grooves in pair in the stationary member. The ball blocking means work to prevent the ball from falling into the circular groove in the stationary member even if the housing is turned over the front parking position from the viewing position when applied with a large external force.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
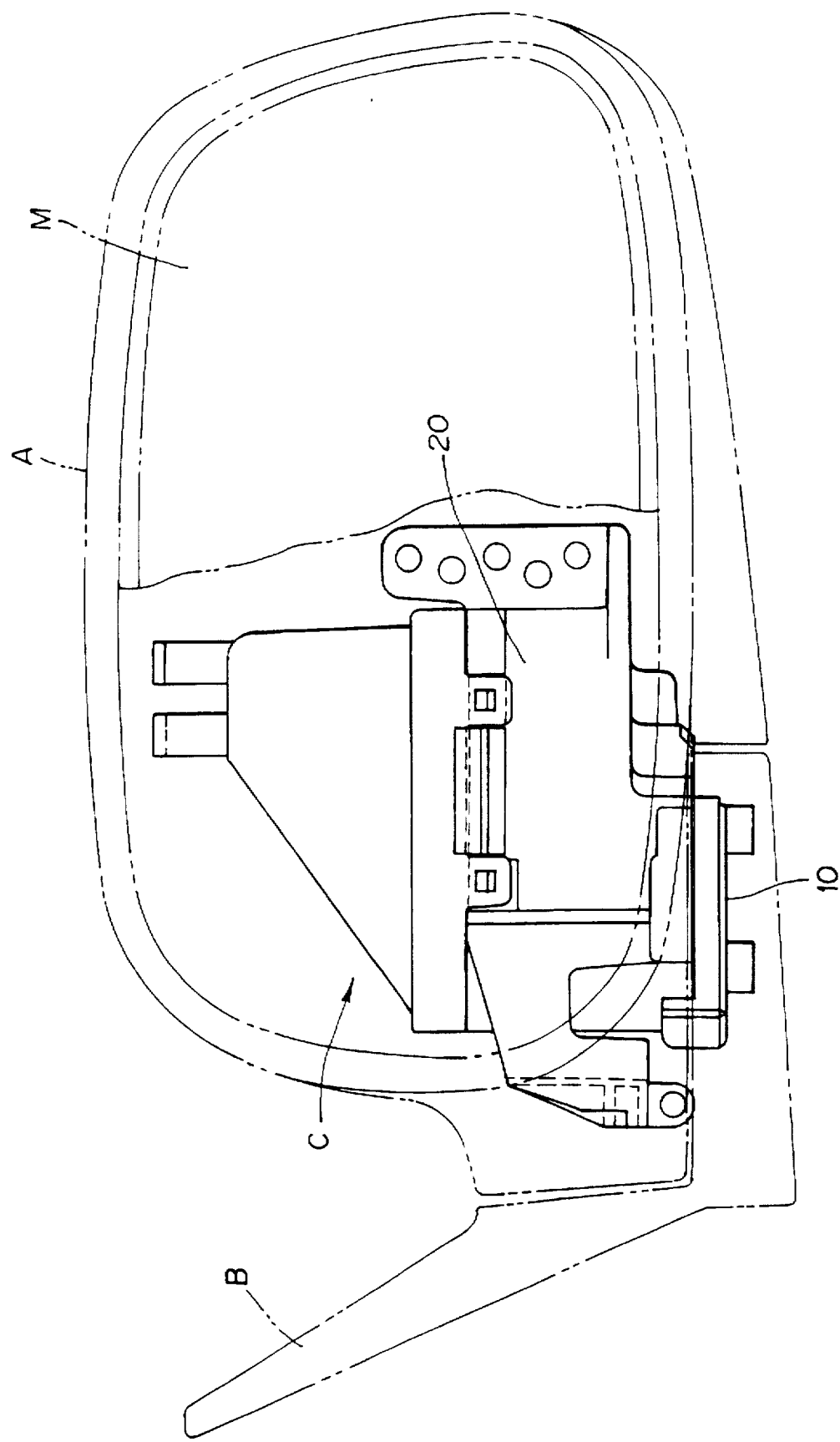
FIG. 1 is a schematic front view of a car sideview mirror in which the positioning device according to the present invention is installed.
Figure 2:
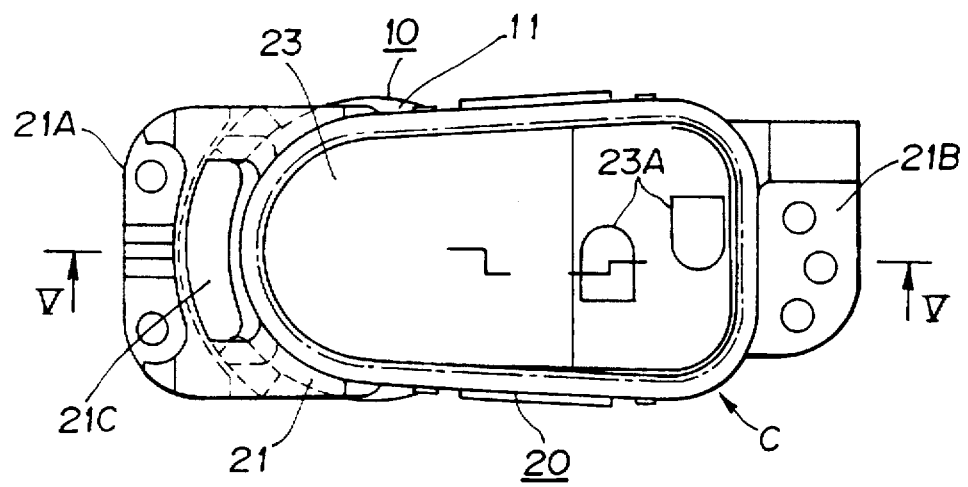
FIG. 2 is a plan view of an embodiment of the positioning device according to the present invention.
Figure 3:
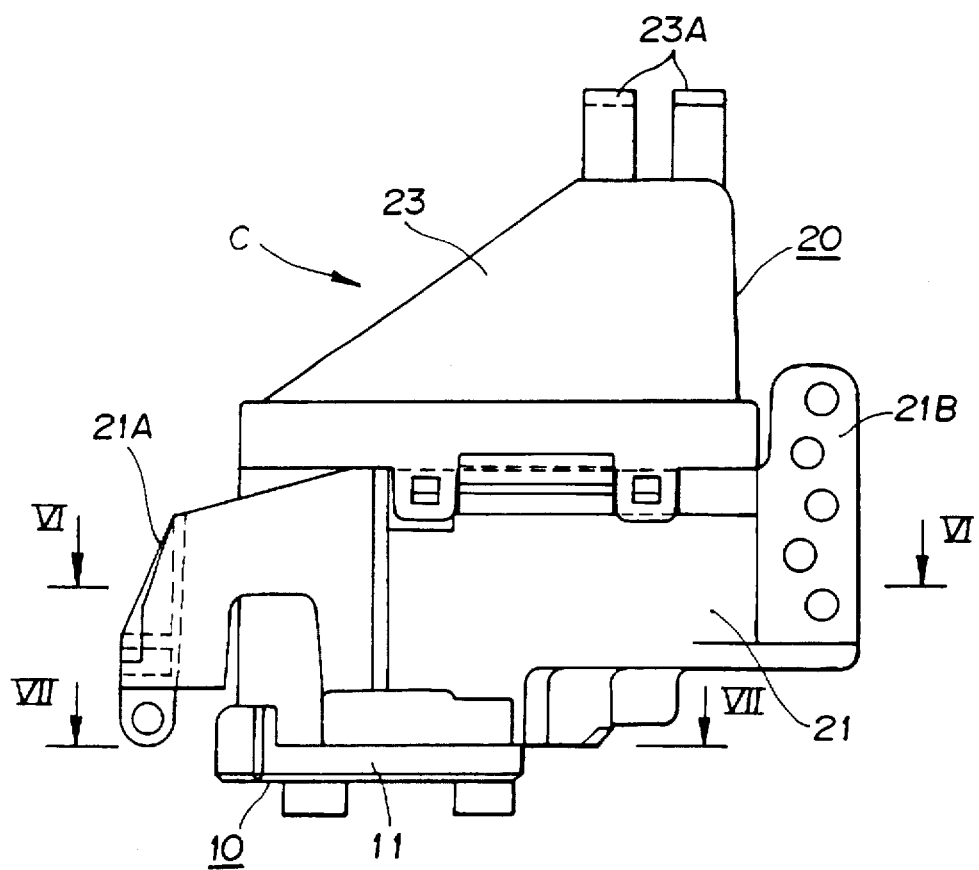
FIG. 3 is a plan view of the positioning device in FIG. 2.

The car sideview mirror shown in FIG. 1 is a driver sideview mirror destined for use on a right-steered car. The sideview mirror comprises a housing A incorporating a mirror unit M, a base B to be fixed to a car body, and a positioning device C to turn the housing A within a predetermined range of angle with respect to the base B.

The housing A has a well-known structure formed in the shape of a thin-wall hollow box partially open at the front thereof. The mirror unit M comprises a mirror and a mirror holder to support the mirror. The mirror unit M is disposed inside the housing A at the front opening of the latter, and it is installed to ball joints included in a mirror actuator disposed at the back of the mirror unit M and bolted to the housing A. The mirror actuator comprises, for example, two rods, motors to move the rods, respectively, independently of each other, a motion converting/speed reducing mechanism, etc. The mirror unit M is tilted as follows. One of the rods is moved back and forth by one of the motors and the motion converting/speed reducing mechanism to push the lower back of the mirror holder which will thus turn the mirror unit M vertically about the ball joint. On the other hand, the other rod is moved back and forth by the other motor and the motion converting/speed reducing mechanism to push the lateral back of the mirror holder which will thus turn the mirror unit M horizontally about the ball joint.

Also the base B has a well-known L-shaped structure, and it is to be fixed at a rising portion thereof to the car body.

The positioning device C and mirror actuator are electrically connected by a harness to a power source and control unit installed in the car. By operating the control unit, the driver can turn the housing A from the viewing position to the rear parking position or vice versa, and tilt the mirror vertically and horizontally within the housing A.

As shown in FIGS. 2 to 9, the positioning device C according to this embodiment comprises a stationary member 10 to be coupled to the base B, a rotary member 20 to be coupled to the housing A, a mechanism including a mechanism to turn the housing A from the viewing position to the rear parking position or vice versa by means of a motor and disposed between the stationary member 10 and rotary member 20 to allow the housing to be turned from the viewing position to the rear or front parking position or vice versa, and a stopping mechanism to block, against a further turn, the housing A having been turned from the viewing position to the rear or front parking position.

The stationary member 10 comprises a generally flat body 11 and a shaft 12 formed integrally on one side of the body 11. A through-hole 13 is formed through the body 11 and shaft 12.

The rotary member 20 comprises a body 21, a partition 22 and a cap 23. The body 21 has a generally box-like structure open at the top thereof. It has formed integrally on either end face thereof portions 21A and 21B to be secured to the housing A. The partition 22 has a seat and the like to support a motor and motor drive circuit board which will be further described later, and it is fitted through the opening in the body 21 in which it is secured. The cap 23 has a generally box-like structure open at the bottom thereof. It is fitted in a socket formed at the upper end of the circumferential wall defining the top opening of the body 21, and sealed with a viscous sealant put in the socket. The rotary member 20 is fitted onto the stationary member 10 with the shaft 12 of the stationary member 10 fitted a hole through the body 21 and partition 22, and thus the rotary member 20 can be turned about the shaft 12 of the stationary member 10. A sliding disc 14 is fitted on the shaft 12 between the stationary member 10 and rotary member 20.

The mechanism to turn the rotary member 20 by means of the motor comprises a motor 30 built in the rotary member 20, a main gear 31 on the shaft 12, a train of gears 32 to 37 disposed between the motor 30 and main gear 31 and built in the rotary member 20, and a clutch mechanism disposed between the main gear 31 and the shaft 21 or stationary member 10.

Figure 6:
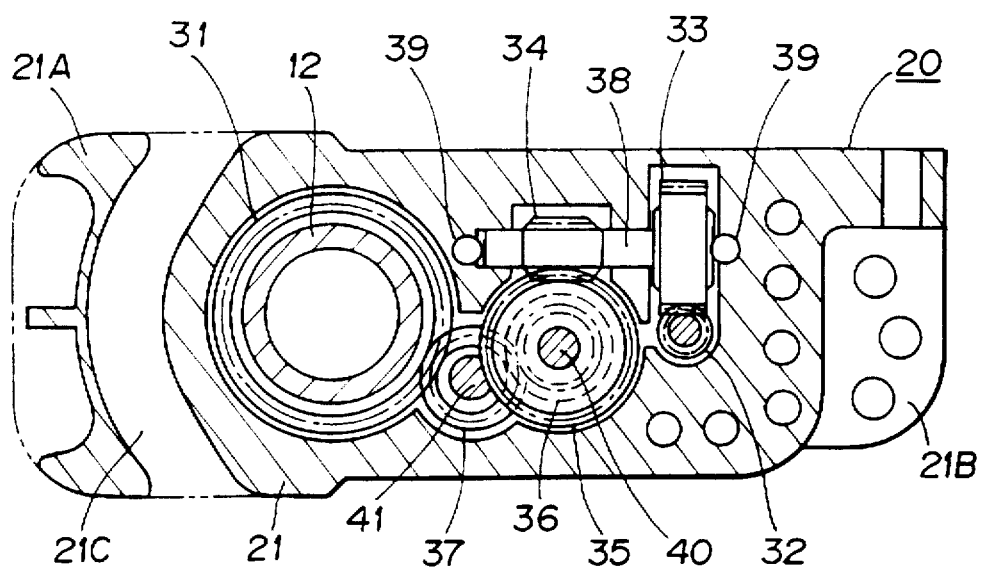
FIG. 6 is a sectional view, taken along the line VI—VI and enlarged in scale, of the positing device in FIG. 3.
Figure 7:
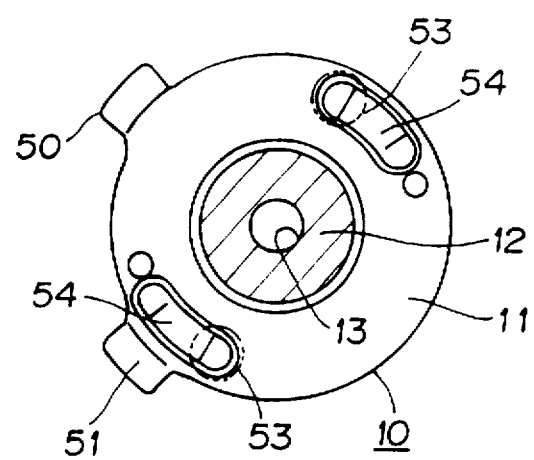
FIG. 7 is a sectional view taken along the line VII—VII in FIG. 3.
Figure 8:
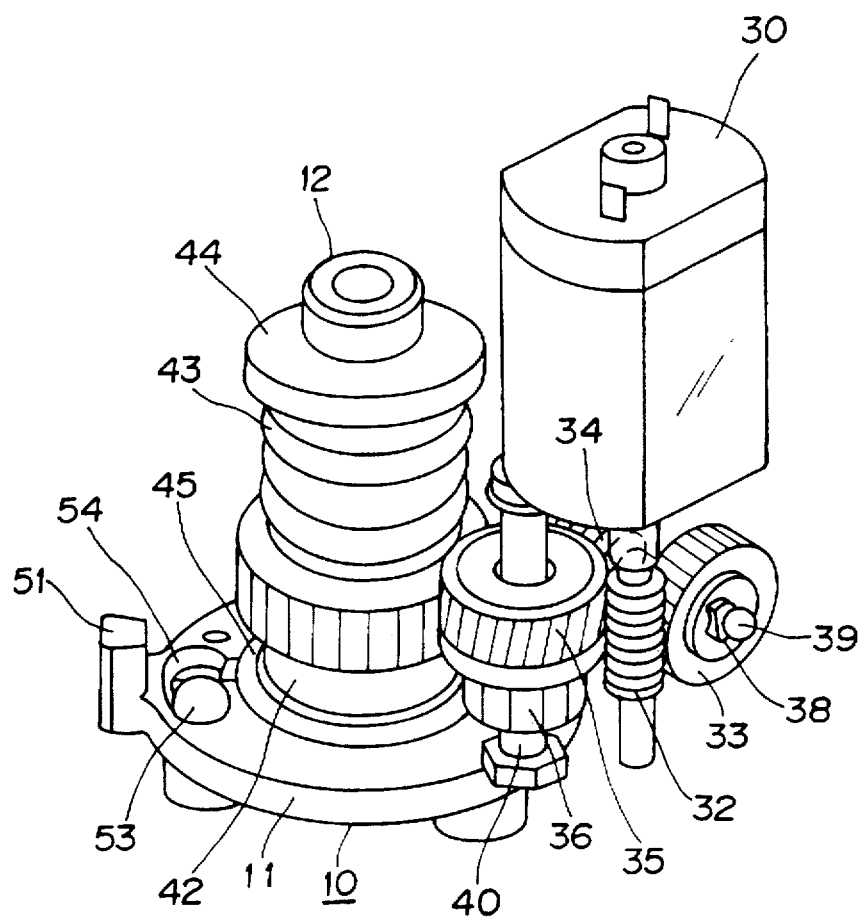
FIG. 8 is a schematic perspective view, enlarged in scale, of the drive mechanism of the positioning device.

The motor 30 has an output shaft extended through a hole formed in the partition 22 and it is fixed to the partition 22. The output shaft of the motor 30 has a worm 31 fixed by means of a shaft coupling to a projecting portion thereof from the partition 22. The worm 32 is in mesh with a worm wheel 33 disposed under the partition 22 as shown in FIG. 6. The worm wheel 33 is fitted and fixed, along with a worm 34, to a gear shaft 38 held in a bearing hole formed in the body 21. A ball 39 is disposed between the free end of the gear shaft 38 and the body 21 to bear a thrust load to the gear shaft 38. Another gear shaft 40 is disposed as penetrated through the partition 22 and bottom wall of the body 21 and has both ends thereof fitted and fixed to the partition 22 and bottom wall, respectively. A further gear shaft 41 is disposed in parallel to the gear shaft 40 and fixed to the body 21. The gear shaft 40 has fitted thereon a worm wheel 35 and spur gear 36 which are disposed coaxially with each other, and the gear shaft 41 has a spur gear 37 fitted thereon. The worm wheel 35 is in mesh with the worm 34 while the spur gear 36 is in mesh with the spur gear 37. On the other hand, the spur gear 37 is in mesh with the main gear 31 which is a spur gear. The main gear 31 is loosely fitted on the shaft 12 and coupled to the shaft 12 by means of the clutch mechanism.

For rotation of the rotary member 30 from the viewing position to the rear parking position, the worm 32 fixed to the output shaft of the motor 30 rotates the worm wheel 33, the worm 34 in mesh with the worm wheel 33 rotates the worm wheel 35 coaxial with the worm 34 while the spur gear 36 rotates the spur gear 37, and the spur gear 37 as a planet gear rotates and revolves around the main gear 31 on the shaft 12 while being in mesh with the main gear 31, thereby rotating the rotary member 20 about the shaft 12. A circuit to drive the motor 30 is formed in a printed wiring board indicated with a reference 46 in FIG. 5. The printed wiring board 46 is disposed in a space defined by the cap 23 and partition 22 and it is fixed to the seat on the partition 22. A harness 47 is passed through the through-hole 13 in the stationary member 10 into the space defined by the cap 23 and partition 22, and connected at one end thereof to the motor drive circuit formed on the printed wiring board 46.

The clutch mechanism is provided to uncouple the rotary member 20 from the stationary member 10 when the rotary member is applied with a larger force than the torque of the motor 30 which drives the rotary member 20. It is disposed between the main gear 31 and stationary member 10 as previously mentioned. This clutch mechanism is called "pawl clutch", "tooth clutch" or the like. The clutch mechanism includes the shaft 12 and the main gear 31 fitted on the shaft 12, and it further comprises a clutch disc 42, a compression spring 43 and spring shoe 44, which are disposed between the main gear 31 and stationary member 10. The shaft 12 has formed on a circumferential portion thereof a parallel flat surface extending longitudinally of the shaft 12. The main gear 31 has a plurality of recesses formed on the side thereof facing the clutch disc 42, and a through-hole having a diameter equal to or slightly larger than that of the shaft 12 so that the main gear 31 can preferably be fitted at the through-hole thereof onto the shaft 12. Thus the main gear 31 is rotatable and slidable on the shaft 12. The clutch disc 42 has formed on the side thereof facing the main gear 31 a plurality of pawls which are to be engaged into the recesses, respectively, in the main gear 31, and a hole having a same shape as the section of the parallel flat surface of the shaft 12. The main gear 31 can preferably be fitted at the hole thereof onto the shaft 12. Thus the main gear 31 is only slidable on the shaft 12. The compression spring 43 is fitted on the shaft 12 between the side of the main gear 31 opposite to the recessed side thereof and the spring shoe 44 fixed to the shaft 12. A sliding disc 45 is fitted on the shaft 12 between the clutch disc 42 and stationary member 10. Normally in this clutch mechanism, the compression spring 43 presses the clutch disc 42 and thus the pawls on the clutch disc 42 are engaged into the respective recessed in the main gear 31 to block the rotary member 20 against rotation. When the rotary member 20 is applied with a larger external force than predetermined, the main gear 31 is blocked against reverse rotation on the shaft 12 by the train of gears 32 to 37. So, the pawls on the clutch disc 42 are disengaged from the recesses in the rotary member 20, and thus the main gear 31 will be rotated on the shaft 12 together with the rotary member 20, motor 30 supported on the rotary member 20 and the train of gears 32 to 37 against the action of the compression spring 43.

The aforementioned mechanism to rotate the rotary member 20 about the shaft 12 of the stationary member 10 within a predetermined range of angle works together with the drive circuit for the motor 30 and the control circuit to position the rotary member 20 at the viewing position and rear/front parking position. This mechanism will be described in detail below.

The mechanism comprises a pair of circular grooves 54 formed in the stationary member 10, a pair of circular grooves 55 formed in the rotary member 20, and balls 53 retained in regions, respectively, defined by the circular grooves 54 and 55, respectively.

The balls 54 in pair are formed in the body 11 of the stationary member 10 symmetrically on a circumference about the housing 12. The central angle α of each circular groove 54 is set corresponding to a predetermined angle (45° in this embodiment) of rearward turn from the viewing position. These circular grooves 54 are stepped at the end portions thereof and thus shallower at the end portions than at the intermediate portion. Further, all the side faces of the grooves are sloped from the surface of the body 11 toward the groove bottoms, and the opposite end faces of the steps are sloped from the top toward the groove bottom.

Further, the circular grooves 55 in pair are provided in the bottom of the body 21 of the rotary member 20 facing the stationary member 10, and on the circle on which the circular grooves 54 are formed. Thus the circular grooves 55 and 54 are located symmetrically with respect to the shaft 12. The central angle β of each circular groove 55 is set to correspond to a turn angle (15° in this embodiment) extending from the above-mentioned predetermined rearward turn angle of the housing A. These circular grooves 55 have a flat bottom and is not stepped at the end portions thereof. The circular grooves 55 formed in the rotary member 20 and the mating circular grooves 54 in the stationary member 10 define together regions in each of which a ball 53 is retained so as to roll.

Figure 10A:
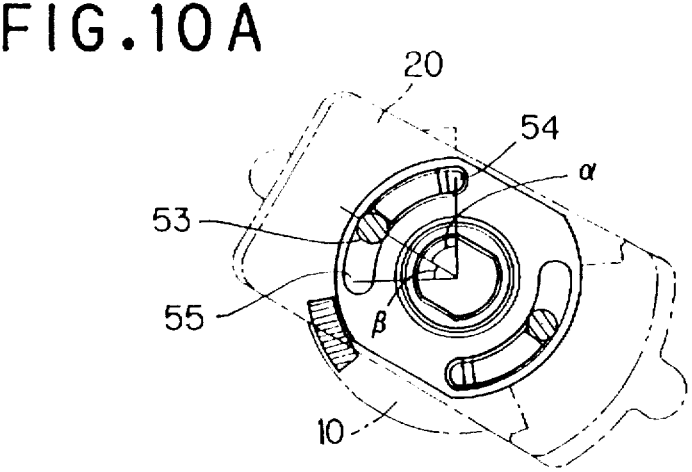
FIGS. 10(A) to 10(C) are schematic views for explanation of the geometric relation among the circular groove in the stationary member, circular groove in the rotary member and balls.
Figure 10B:
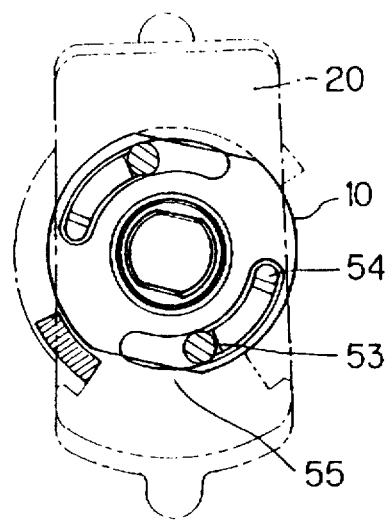
Figure 10C:
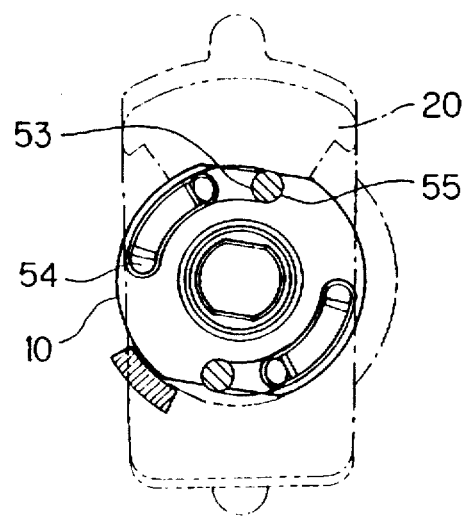

FIG. 10(A) shows the geometric relation between the circular grooves 54, 55 and balls 53 when the housing A is at the viewing position, FIG. 10(B) shows such relation when the housing A is at the rear parking position, and FIG. 10(C) shows such relation when the housing A is at the front parking position. In this Figures, the balls 53 in pair are indicated with small black circles.

The central angles α and β of the circular grooves 54 and 55 are defined here to be angles defined between the lines connecting the ball center and the center of rotation under the assumption that the ball 53 is positioned at the opposite ends of each circular groove. Also, the viewing position in this embodiment is such that the housing A forms an angle of 60° with respect to the longitudinal center line of a car body, and the rear/front parking position is such that the housing A is generally parallel with the longitudinal center line of the car body.

In the viewing position shown in FIG. 10(A), one end of the circular grooves 54 in the stationary member and one end of the circular grooves 55 in the rotary member 20 coincide with each other on the longitudinal center line of the positioning device. Each ball 53 is positioned in a region between the ends of the circular grooves 54 and 55 and rides on the step in the circular groove 54 in the stationary member 10. When the rotary member 20 is rotated by the motor 30 from the viewing position to the rear parking position, it first slides on the balls 53 and rotates through an angle corresponding to the central angle β of the circular groove 55, the trailing edges of the circular grooves 55 in the rotary member 20 opposite to the direction of rotation touch and push the balls 53, so that the balls fall from on the steps to the bottoms of the circular grooves 54 in the stationary member 10. When the rotary member 20 further rotates along with the balls 53 through an angle corresponding to the central angle a of the circular grooves 54 in the stationary member 10, the balls 53 ride on the steps at the end portions of the circular grooves 54 in the stationary member 10, abut the end faces of the circular grooves 54 and thus blocked against further rolling, as indicated with a two-dot chain line in FIG. 11. When the balls 54 ride on any of the steps of the circular grooves 54, the control circuit incorporated in the motor drive circuit is put into action to deenergize the motor 30 and the housing A is set to the rear parking position as shown in FIG. 10(B). Such control circuit per se is well known. As known from the disclosure in JP-U4-76169, for example, when the ball 53 rides on the step formed at any of the end portions of the circular grooves 54 and the loading to the motor 30 is increased, a positive-going characteristic thermister detects an overcurrent concurrently flowing through the motor 30 and disconnects the power from the motor 30.

When the rotary member 20 is rotated by the motor 30 from the rear parking position to the viewing position as shown in FIG. 10(B), it first slides on the balls 54 and rotates through an angle corresponding to the central angle β of the circular grooves 55. The trailing edge of the circular groove 55 in the rotary member 20 opposite to the direction of rotation touches and pushes the ball 53, so that the ball 53 rolls from on the step to the bottom of the circular groove 54 in the stationary member 10. When the rotary member 10 further rotates along with the ball 53 through an angle the ball ring to the central angle a of the circuit grooves 54, the ball rides on the step at the other end portion of the circular groove 54 in the stationary member 10 as indicated with a solid line in FIG. 11, thus the housing A is set to the viewing position.

When a person or thing touches the housing A in the viewing position and thus an external force larger than predetermined is applied to the housing A rearwardly, the rotary member 20 is rotated along with the balls in the direction of the rear parking position as in the above.

Further, when a person or thing touches the housing A in the viewing position and thus an external force larger than predetermined is applied to the housing A forwardly, the ball 53 is pushed by the trailing edge of the circular groove 55 in the rotary member 20, overrides the circular groove 54 in the stationary member 10 and moves toward the end of the adjoining circular wall 54 as shown in FIG. 10(C), thus the housing A is set to the front parking position.

Figure 4:
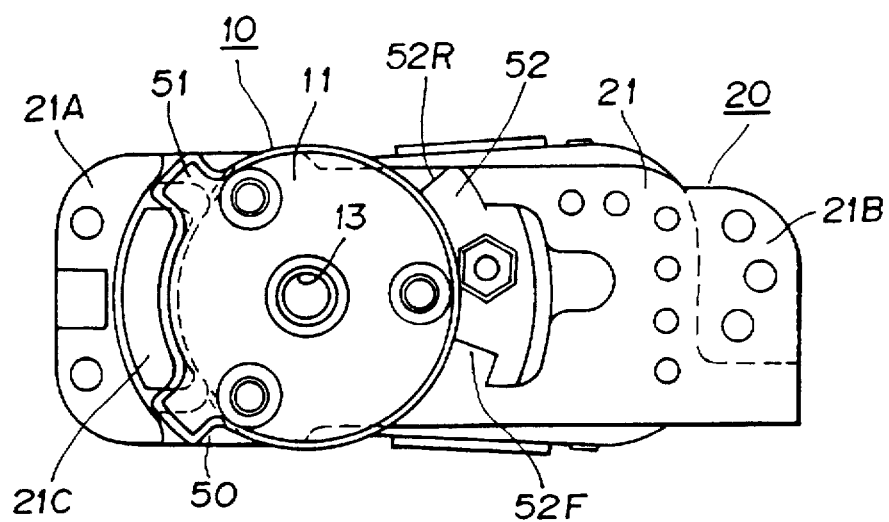
FIG. 4 is a bottom view of the positioning device in FIG. 2.
Figure 5:
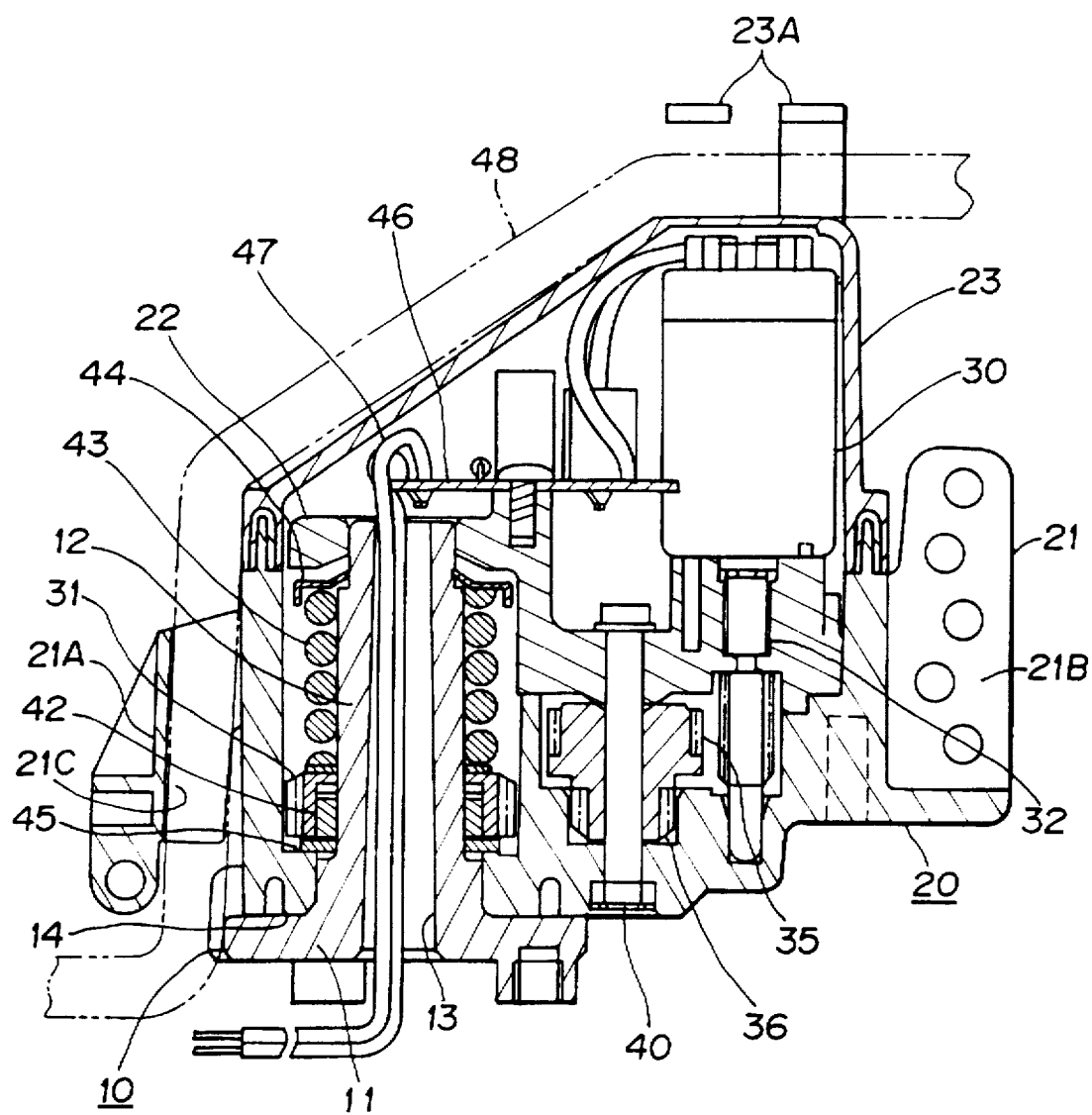
FIG. 5 is a sectional view, taken along the line V—V and enlarged in scale, of the positioning device in FIG. 2.
Figure 9:
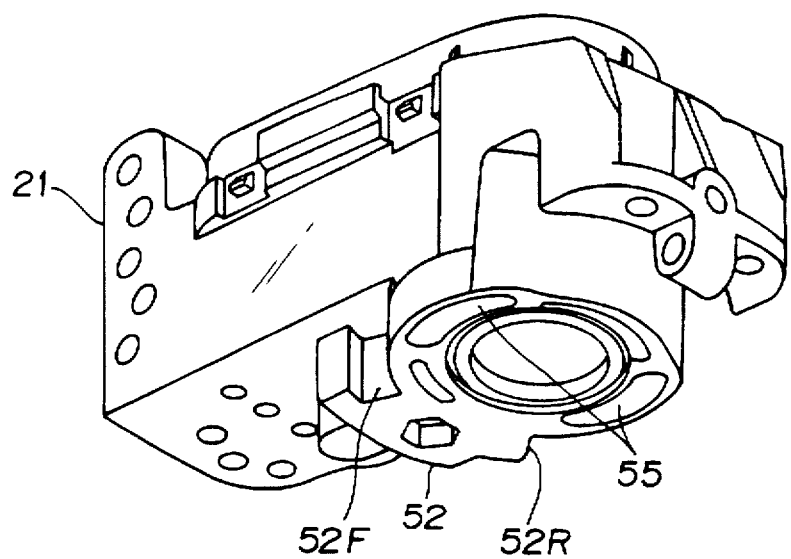
FIG. 9 is a perspective view, from the bottom, of the rotary member of the positioning device.

The rotary member 20 is designed for rotation through a maximum angle (α+β) rearward from the viewing position as well as through a maximum angle γ=(180°−α) forward from the viewing position. For this rotation, the stationary member 10 and rotary member 20 are provided with a mechanism or a stopping mechanism, for blocking the rotary member 20 against rotation when the housing A is in the aforementioned rear or front parking position. The stopping mechanism itself comprises projections 50 and 51 on the stationary member 10 and a projection 52 on the rotation member 20. As shown in FIG. 4, the projections 50 and 51 are provided on the side of the body 11 of the stationary member 10 opposite to the rotary member 20, and the projection 52 is provided on the side of the rotary member 20 opposite to the stationary member 10 as shown in FIGS. 4 and 9. The projections 50 and 51 on the stationary member 10 are located on a circle centered to the axis of rotation of the rotary member 10, while the projection 52 on the rotary member 20 is located on a circle having a same radius as that of the circle centered to the axis of rotation of the rotary member 20 and on which the projections 50 and 51 on the stationary member 10 are laid. The projections 50 and 51 are located on the stationary member 10 and rotary member 20 in such a manner that when the rotary member 20 is rotated to the rear parking position, the projection 50 touches an end face 52A of the projection 52 on the rotary member 20 to block the latter against rotation and that when the rotary member 20 is rotated from the viewing position to the rear parking position, the projection 51 touches an end face 52B of the projection 52 to block the rotary member 20 against rotation.

The positioning device C is assembled to the housing A and base B as will be described below:

The stationary member 10 is inserted into the housing A through the bottom opening of the housing A. The rotary member 20 is bolted to seats formed on the housing A. The stationary member 10 is fitted into a concavity formed in a horizontally extending portion of the base B, secured by bolting or the like to the base B. The end of the harness 47 led out of the stationary member 10 is connected to the control unit provided inside a car body. It should be noted that the other wire 48 of the harness 47 is used to connect the control unit to the motors in the mirror actuator which tilts the mirror built in the housing A. The wire 48 is passed through an opening 21C formed in a portion of the body 21 of the rotary member 20 that joins the rotary member 20 to the housing A and held by retainers 23A on the cap 23.

In the car sideview mirror according to this embodiment, the maximum angle of the rearward turn from the viewing position and the maximum angle of the forward turn from the viewing position of the rotary member 20 of the positioning device C can be increased by an angle corresponding to the central angle β (about 15°) of the circular grooves 55 formed in the rotary member 20, as shown in FIGS. 10(A) to 10(C). Therefore, preparation of a stationary member 10 in which only the element position of the stopping mechanism is changed with the central angles and positions of the circular grooves remained unchanged, allows a positioning device C for a driver sideview mirror used on a right-steered car to be used in a passenger sideview mirror used on a left-steered car. Hence, the rotary member 20, motor 30 built in the rotary member 20, and train of gears 31 to 37 can be used commonly in a driver sideview mirror on a right-steered car as well as in a passenger sideview mirror on a left-steered car.

Figure 13A:
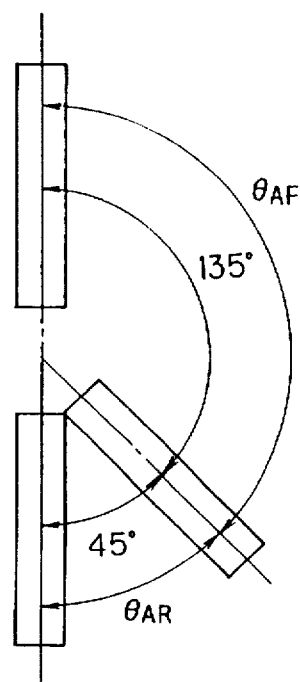
FIG. 13 is an explanatory drawing showing one example of the required turn angle of the housing when the sideview mirror with the positioning device is used on a car.
Figure 13B:
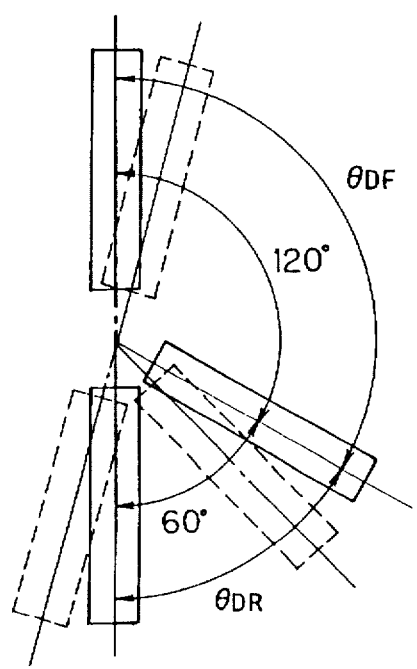

This will be further described below:

As indicated with a solid line at the right in FIG. 13, the turn angle $\theta_{DR}$ between the viewing position and rear parking position in a driver sideview mirror on a right-steered car is set 60°, and the turn angle $\theta_{DF}$ between the viewing position and front parking position is set 120°. As indicated with a solid line at the left in FIG. 13, the turn angle $\theta_{AR}$ between the viewing position and rear parking position in a passenger sideview mirror on a left-steered car is set 45°, and the turn angle $\theta_{AF}$ between the viewing position and front parking position is set 135°.

In case a positioning device (indicated with a solid line at the right in FIG. 13) for a driver sideview mirror used on a conventional right-steered car is used as it is in a passenger sideview mirror on a left-steered car (as indicated with a solid line at the left in FIG. 13), the positioning device is located as indicated with a broken line at the right in FIG. 13. The housing can be turned through an angle of 45° forward from the viewing position in which the mirror forms an angle of 45° with respect to the longitudinal center line of the car body. However, since the forward turn angle of the housing from the viewing position is 120°, the housing cannot be turned to a rear parking position ($\theta_{AF}=135°$) required for the passenger sideview mirror on the left-steered car. So, each conventional sideview mirror on each car used to need a unique positioning device. This is also true for the passenger sideview mirrors on right-steered cars and driver sideview mirrors on left-steered cars.

Figure 14A:
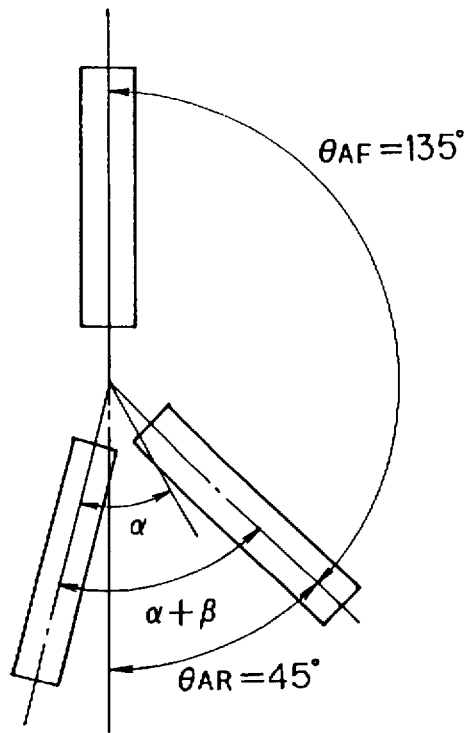
FIG. 14 is a drawing of the housing turn angle, explaining that the positioning device of the driver sideview mirror on a right-steered car according to the present invention can be used the passenger sideview mirror of a left-steered car.
Figure 14B:
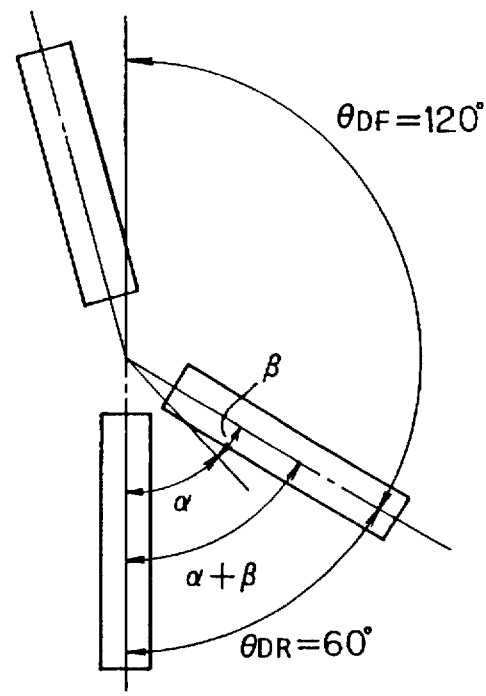

On the other hand, the maximum angle of rearward rotation from the viewing position of the rotary member 20 in the car sideview mirror according to the present invention, is set α (=central angle of the circular grooves 54 in the stationary member 10=45°)+β(=central angle of the circular grooves 55 in the rotary member=15°)=60°, while the maximum angle of forward turn from the viewing position is set 180°−α=135°, as shown at the right in FIG. 14. Therefore, the positioning device C can be built in a passenger sideview mirror on a left-steered car as shown at the left in FIG. 14. In this case, the angle of 45° of the housing A between the viewing position and the longitudinal center line of the car body and the maximum forward turn angle of 135° meet the angle between the viewing and front parking positions of the housing A required for the passenger sideview mirror on the left-steered car. Namely, the housing A can be turned to a position parallel to the center line of the car. The maximum angle of rearward turn is α+β=60° so that the housing A can be turned through a larger angle than the angle (45°) between the viewing and rear parking positions required for a passenger sideview mirror on a left-steered car. This can be attained by changing only the positions of the stopping-mechanism elements of the stationary member 10 to those for the rear parking position required for the passenger sideview mirrors on left-steered cars. That is to say, preparation of a stationary member in which only the positions of the stopping-mechanism elements of the stationary member 10 are changed with the central angle and position of the circular grooves remained unchanged, allows the positioning device C for driver sideview mirrors on right-steered cars to be used in the passenger sideview mirrors on left-steered cars.

Figure 11:
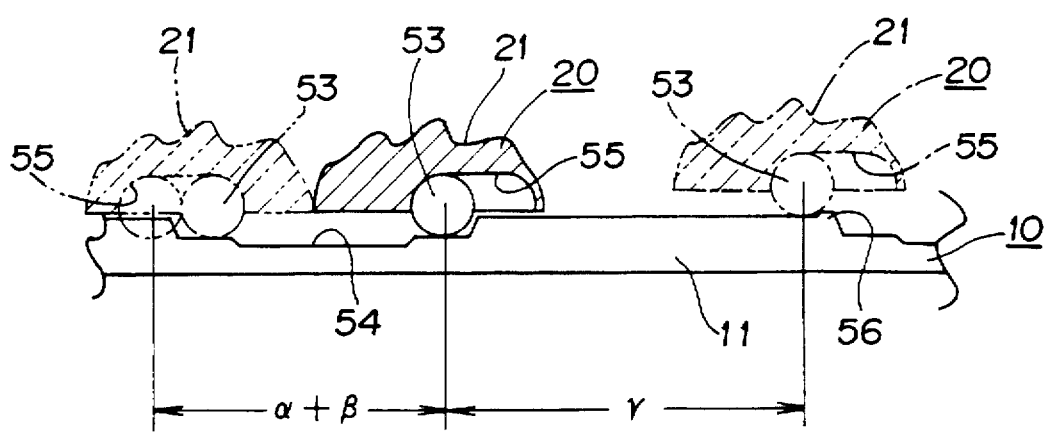
FIG. 11 is a schematic sectional view for explanation of the maximum angles of housing turn from the viewing position to rear and front parking positions.
Figure 12:
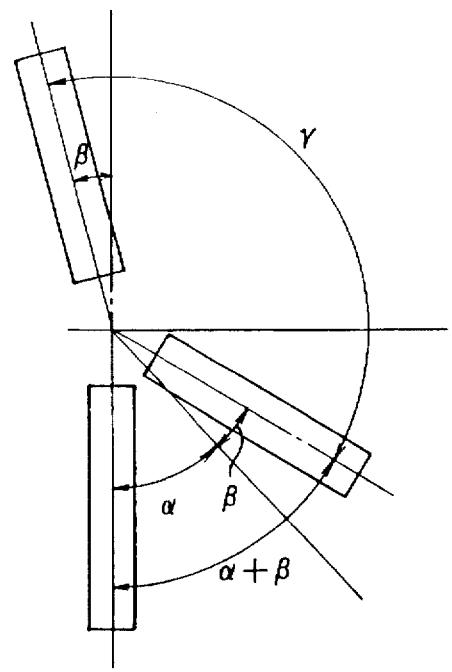
FIG. 12 is a drawing for explanation of the turn angles of the rotary member and housing in the positioning device according to the present invention.

Further, the car sideview mirror according to the present invention has provided between the two circular grooves 54 in the stationary member 10 composing the positioning device means of blocking the balls 53 against rotation. The blocking means may comprise a projection, concavity or the like, and they should preferably be a projection 56 as shown in FIG. 11. The projection 56 is located near each of the ends located diagonally of the circular grooves 54 in the stationary member 10. When a very large external force is applied to the housing A forwardly and thus acts on the rotary member 20 for rotation over the front parking position, the ball 53 is blocked by the projection 56 against rotation and fall into the adjoining circular groove 54. Thus, the rotary member 20 at the front parking position can be positively blocked against rotation over that front parking position.

The housing A of the sideview mirror according to this embodiment can be turned by the driver operating a control forming a part of the controller to run the motor 30. When the motor 30 is put into run with the housing A at the viewing position, the rotary member 20 is rotated about the shaft 12 while the housing A is turned toward the back of the car. When the housing A has been turned from the viewing position to a rear parking position where it is generally parallel with the lateral side of the car and the ball 53 has ridden on the step formed at the other end portion of the circuit groove 54, the aforementioned circuit formed in the motor drive circuit works to deenergize the motor 30, thus the housing A is stopped from further turning. When the motor 3 is put into reverse run by the driver operating the control, the housing A is turned from the rear parking position to the viewing position. When the housing A comes to the viewing position, the ball 53 is moved to the initial position and rides on the step formed at the end portion of the circular groove 54. Thus the circuit disconnects the power from the motor 30. Even if vibration of the car body is conveyed to the sideview mirror after the housing A has been turned to the rear parking or viewing position, the housing A is not freely turned from the rear parking or viewing position owing to the automatic engagement between the worm 32 and worm wheel 33 included in the train of gears 32 to 37 and that between the worm 34 and worm wheel 35.

If a person or thing collides with the housing A in the viewing position while the motor 30 is deenergized, the pawls of the clutch disc 42 composing the clutch between the main gear 31 and stationary member 10 are disengaged from the recesses in the main gear 31, the main gear 31 in mesh with the gear 37 rotates on the shaft 12 along with the rotary member 20, so that the housing A is turned toward the rear or front parking position depending upon the direction in which the external force is applied to the housing A. When the housing A is turned in the direction of the front parking position, the ball 53 overrides the end of the circular groove 54 and rolls on the surface of the stationary member 10, raising the rotary member 20 together with the housing A and thus further compressing the compression spring 43. To return the housing A to the viewing position, it has to be pushed by hand in the opposite direction. When the housing A is pushed, the ball 53 falls again into the circuit groove 54, the rotary member 20 falls down along with the housing A, the pawls of the clutch disc 42 are engaged into the recesses in the main gear 31 under the action of the compression spring 43, and the rotary member 20 is thus forced to the stationary member 10 again.

The position of the housing A can be adjusted by the driver pushing the housing A by hand with the motor 30 stopped. The pawls of the clutch disc 42 are disengaged from the recesses in the main gear 31 and the rotary member 20 is rotated along with the housing A about the shaft 12. When the housing A is returned to the viewing position, the ball 53 falls into the circular groove 54, the pawls of the clutch disc 42 fit into the recesses in the main gear 31, and the rotary member 20 is coupled to the stationary member 10, thereby positioning the housing A.

Figure 15:
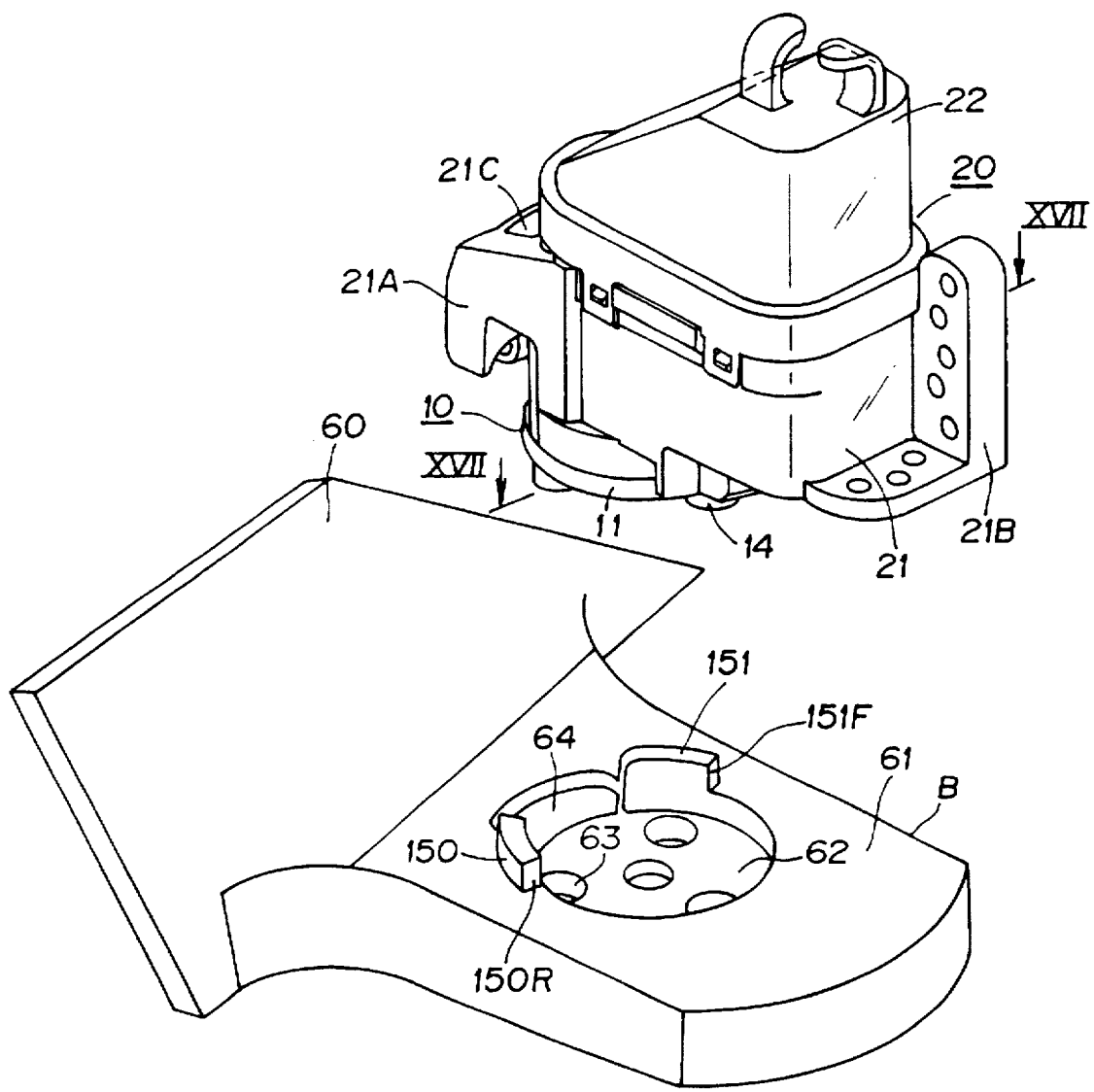
FIG. 15 is an exploded perspective view of another embodiment of the positioning device according to the present invention.
Figure 16:
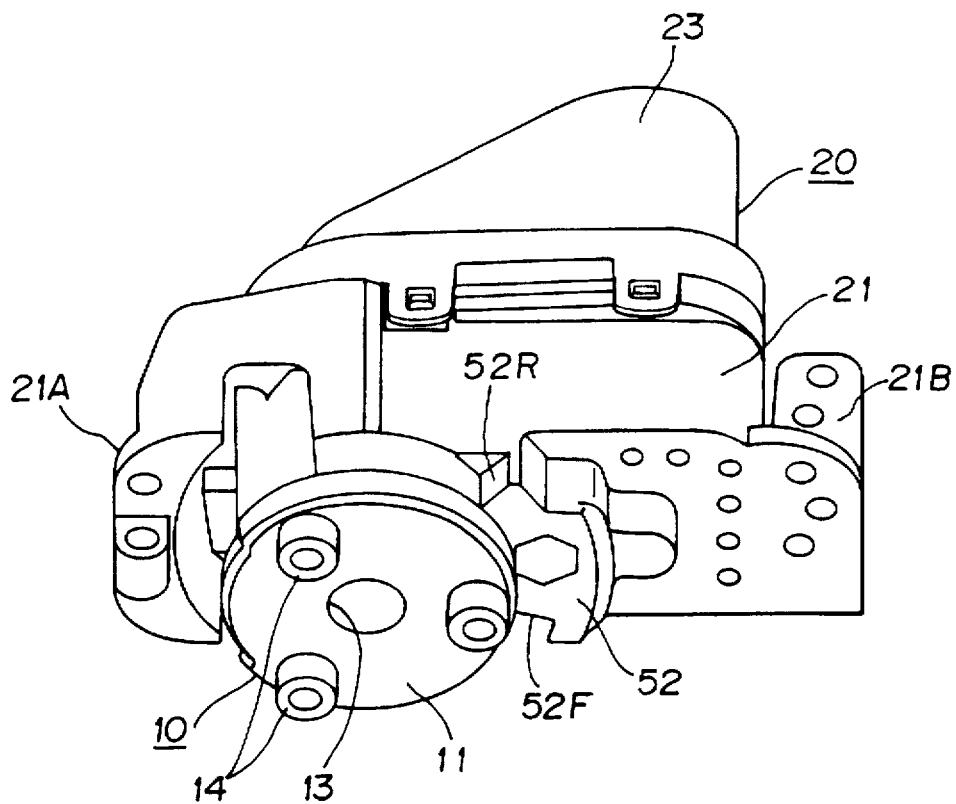
FIG. 16 is a perspective view, from the bottom, of the positioning device in FIG. 15.
Figure 17:
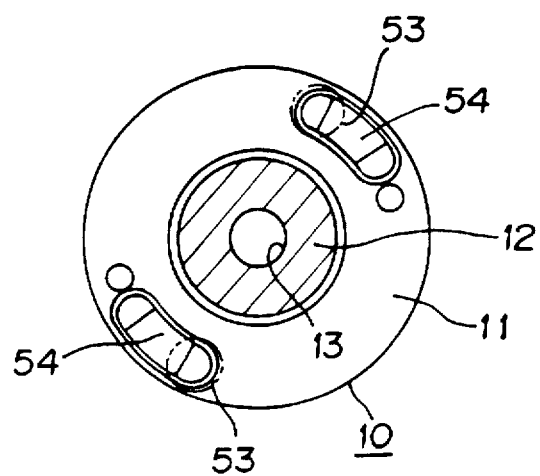
FIG. 17 is a sectional view taken along the line XVII—XVII in FIG. 15.

FIGS. 15 to 17 show together another embodiment of the car sideview mirror according to the present invention. This embodiment is different from the first embodiment in location of the stopping mechanism which blocks the rotary member 20 against rotation at the rear or front parking position. In the following brief description of the second embodiment, same or like elements as in the first embodiment are indicated with same or like references. As shown in FIG. 17, the stationary member 10 has circular grooves 54 formed therein, but has not any projections as stopping elements which operate in cooperation with a stopping element provided on the rotary member 20 to block the rotary member 20 against rotation when the rotary member is rotated to the rear or front parking position. Such projections are provided on the base B.

The base B has a generally L-shaped form as shown in FIG. 15. It has formed in one side 60 thereof holes for bolts to fix the mirror to the car body and in the other side 61 thereof a concavity 62 in which the stationary member 10 of the positioning device C is fitted. The concavity 62 has formed therein a hole 63 to receive the boss of the rotary member 10, and an opening 64 corresponding to the opening 21C through which the harness 47 is passed as previously mentioned. Projections to block the rotary member 20 against rotation are indicated with references 150 and 151. They are disposed integrally on the base B on a circle centered to the axis of turning of the housing A and the axis of rotation of the rotary member 20 of the positioning device C. When the positioning device C is assembled to the base B, the projections 150 and 151 extend at the ends thereof to the bottom of the rotary member 20, passing by the perimeter of the body 11 of the stationary member 10. The projection 52 on the rotary member 20 is shown in FIG. 16. Its basic configuration is the same as that in the sideview mirror having been described with reference to FIGS. 1 to 14.

13

The positioning device C is assembled to the housing A and base B as will be described below:

With the stationary member 10 protruded outwardly, the positioning device C is placed inside the housing A and secured to the housing, the stationary member 10 is fitted into the concavity 62 in the base B and bolted to the base B. When the positioning device C is thus secured to the base B, the projections 150 and 151 will come to the bottom of the rotary member 20, passing by around the body 11 of the stationary member 10. When the housing A is turned to the rear parking position, the projection 52 abuts, at an end face 52R thereof, an end face 150R of the projection 150 to block the rotation of the rotary member 20 and turn of the housing A. When the housing A is turned to the front parking position, the projection 52 abuts, at a end face 52F thereof, an end face 151F of the projection 151 to block the rotation of the rotary member 20 and turn of the housing A.

According to the present invention, the housing A at the rear or front parking position is blocked against turning by the contact between the projections 150 and 151 formed on the base B and the projection 52 formed on the rotary member 20. Therefore, a same positioning device C can be used for either of the right- and left-steered cars without replacing the stationary member 11.

When the housing A is turned to the rear parking position, the projection 150 on the base B abuts the end face 52R of the projection 52 on the rotary member 20 to block the rotary member 20 against rotation. When the housing A is turned to the front parking position, the projection 151 abuts the end face 52F of the projection 52 to block the rotary member 20 against rotation.

The base B composing an aforementioned sideview mirror is formed for each of different models of cars. It is possible to mold the base B with the rotation-blocking base-side stopping mechanism elements changed in position according to each car model. Therefore, a same positioning device can be used commonly in sideview mirrors on cars of different models. Thus the positioning devices C can be made commoner for use in sideview mirrors on different models of cars.

As having been described in the foregoing, the positioning device C for car sideview mirrors and the car sideview mirrors equipped with the positioning device C, according to the present invention, can use its parts or the positioning device C commonly in the sideview mirrors different in angle between the viewing and rear parking position and that between the viewing and front parking positions. Therefore, the number of types of the positioning device C can be reduced, and mass production of the positioning devices and sideview mirrors allows an management of the products at lower costs, reduction in quantity of necessary parts, cost down of parts, and a reduction of costs for inspection and management of molds, jigs, parts and the like.

What is claimed is:

1. A positioning device for a car sideview mirror having a base which is to be fixed to a car body and a housing having a mirror unit assembled therein, said positioning device designed to turn the housing to a viewing position where the housing protrudes laterally from the car body, a rear parking position where the housing is directed toward the rear end of the car body while the mirror side of the housing faces directly the lateral side of the car body, and to a front parking position where the housing is directed toward the front end of the car body while the rear side of the housing faces directly the lateral side of the car body, said positioning device, comprising:

a stationary member coupled to the base and having a shaft;

a rotary member coupled to the housing; and a mechanism disposed between the stationary and rotary members to turn the rotary member about the shaft of the stationary member;

there being provided on the stationary and rotary members a stopping mechanism to limit the turn angle of the housing to a predetermined range;

the rotary member turning mechanism comprising a pair of arcuate grooves formed in the stationary member, each having a central angle corresponding to the predetermined angle of the rearward turn of the housing from the viewing position, a pair of arcuate grooves formed in the rotary member oppositely to, and on a substantially same circumference as that of, the pair of arcuate grooves in the stationary member, each having a central angle corresponding to a predetermined angle of turn extending from the predetermined angle of rearward turn of the housing, and a pair of balls disposed between the stationary and rotary members so as to roll circumferentially of the arcuate grooves in the members.

2. A positioning device as set forth in claim 1, wherein the pair of arcuate grooves in the stationary member and those in the rotary member, respectively, are provided in symmetric positions, with respect to the shaft, and wherein, as the rotary member is rotated from the viewing position to the rear parking position or vice versa, each of the balls is allowed under pressure of the trailing edge of each arcuate groove in the rotary member to roll within a region defined by the arcuate groove formed in the stationary member and that in the rotary member, and as the rotary member is rotated from the viewing position to the front parking position or vice versa, each ball is allowed under pressure of the trailing edge of each arcuate groove in the rotary member to override each arcuate groove in the stationary member and further roll along each arcuate groove in the rotary member.

3. A positioning device as set forth in claim 1, wherein a means of blocking the ball from rolling is provided near each end of the arcuate grooves located diametrically each other in pair in the stationary member, to prevent the ball from falling into the arcuate groove in the stationary member even if the housing is turned over the front parking position when applied with a large external force.

4. A car sideview mirror having, comprising:

a base to be fixed to a car body;

a housing having a mirror unit assembled therein; and a positioning device configured assemblable as an unit before installation to the base and housing and designed to turn the housing to a viewing position where the housing protrudes laterally from the car body, a rear parking position where the housing is directed toward the rear end of the car body while the mirror side of the housing faces directly the lateral side of the car body, and to a front parking position where the housing is directed toward the front end of the car body while the rear side of the housing faces directly the lateral side of the car body, said positioning device, comprising:

a stationary member coupled to the base and having a shaft, a rotary member coupled to the housing, and a mechanism disposed between the rotary and stationary members to rotate the rotary member about the shaft of the stationary member; and a pair of arcuate grooves formed in the stationary member, each having a central angle corresponding to the predetermined angle of the rearward turn of the housing from the viewing position, a pair of arcuate grooves formed in the rotary member oppositely to, and on a substantially same circumference as that of, the pair of arcuate grooves in the stationary member, each having a central angle corresponding to a predetermined angle of turn extending from the predetermined angle of rearward turn of the housing, and a pair of balls disposed between the stationary and rotary members so as to roll circumferentially of the arcuate grooves in the members; and a stopping mechanism provided on the rotary member and base and consisting of a projection formed on the stationary member and a one on the rotary member, the projections being engageable with each other to limit the turn angle of the housing to a predetermined range.

5. A car sideview mirror as set forth in claim 4, wherein a means of blocking the ball from rolling is provided near each end of the arcuate grooves located diametrically opposite each other in pair in the stationary member to prevent the ball from falling into the arcuate groove in the stationary member even if the housing is turned over the front parking position when applied with a large external force.

6. A car sideview mirror, comprising:

a base to be fixed to a car body;

a housing having a mirror unit assembled therein;

a positioning device to turn the housing on the base; and a stopping mechanism to limit the turn angle of the housing to a predetermined range, said positioning device, comprising:

a stationary member coupled to the base and having a shaft;

a rotary member coupled to the housing and rotatable about the shaft;

a main gear loose-fitted on the shaft;

a clutch disc fitted on the shaft to compose in cooperation with the main gear a clutch;

a compression spring to maintain the clutch disc and main gear in contact with each other;

a motor built in the rotary member;

a train of gears having a gear which is in mesh with the main gear, and built in the rotary member;

a pair of arcuate grooves formed in the stationary member in symmetric positions with respect to the shaft;

a pair of arcuate grooves formed in the rotary member in symmetric positions with respect to the shaft; and a pair of balls retained so as to roll in regions defined by the arcuate grooves in the stationary member and those in the rotary member.

* * * * *